(No Model.) 4 Sheets—Sheet 1.

G. L. BARNES.
SHAFT COUPLING.

No. 465,552. Patented Dec. 22, 1891.

WITNESSES:
John L. Larkins
Alpheus J. Larkins

INVENTOR
George L. Barnes (No Model.) 4 Sheets—Sheet 2.

G. L. BARNES.
SHAFT COUPLING.

No. 465,552. Patented Dec. 22, 1891.

WITNESSES:
John L. Lenkins
Alpheus I. Larkins

INVENTOR
George L. Barnes (No Model.) 4 Sheets—Sheet 3.
G. L. BARNES.
SHAFT COUPLING.

No. 465,552. Patented Dec. 22, 1891.

WITNESSES:
John L. Larkins
Alpheus J. Larkins

INVENTOR
George L. Barnes (No Model.)  4 Sheets—Sheet 4.
G. L. BARNES.
SHAFT COUPLING.
No. 465,552. Patented Dec. 22, 1891.
Fig. 13
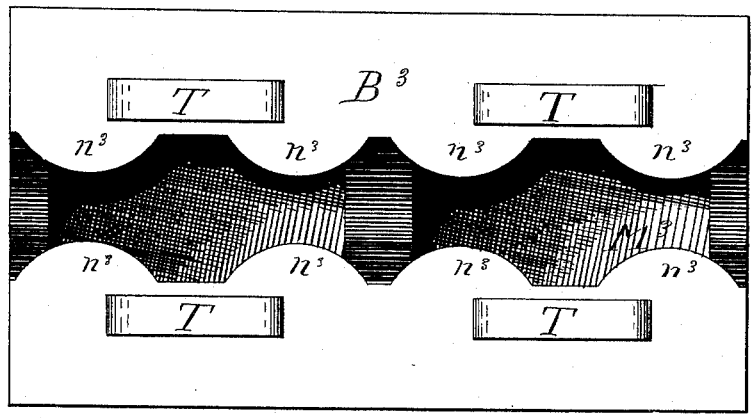
Fig. 14
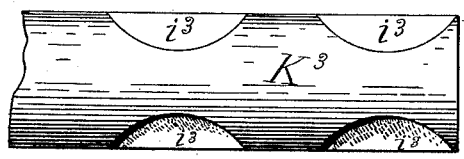
Fig. 15
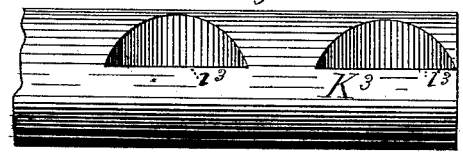
Fig. 16
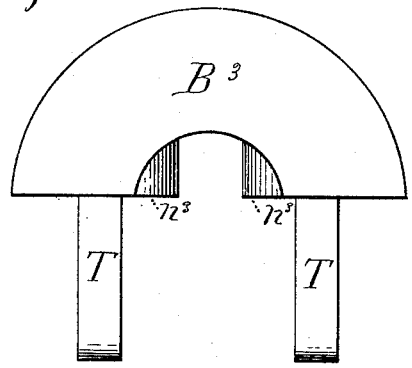
Fig. 17   Fig. 18
Fig. 19
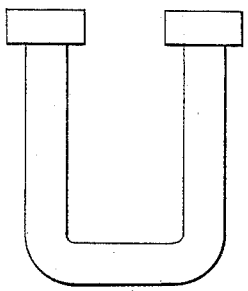
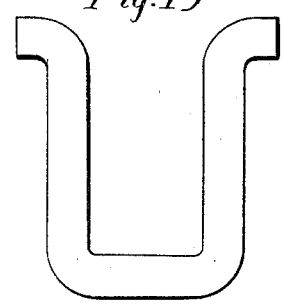
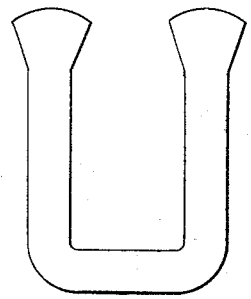
WITNESSES:
John L. Larkins
Alpheus J. Larkins
INVENTOR
George L. Barnes

UNITED STATES PATENT OFFICE.

GEORGE L. BARNES, OF MONTOWESE, CONNECTICUT.

SHAFT-COUPLING.

SPECIFICATION forming part of Letters Patent No. 465,552, dated December 22, 1891.

Application filed May 5, 1890. Serial No. 350,571. (No model.)

*To all whom it may concern:*

Be it known that I, GEORGE L. BARNES, a citizen of the United States, residing at Montowese, in the town of North Haven, county of New Haven, and State of Connecticut, have invented certain new and useful Improvements in Shaft-Couplings, of which the following is a specification.

My invention relates to improvements in shaft-couplings, and has for its object to provide a simple compression-coupling, which is adapted to serve as a pulley and rigidly couple the shafts together in accurate alignment, positively and securely held both torsionally and endwise, but readily permitting the coupling and uncoupling of the parts with the utmost facility.

The invention consists in the novel means for clamping the compression-sections together, in the mode of engaging the shafts with one of the compression-sections to hold them torsionally and endwise, and in the peculiarities in the construction of the parts, all as hereinafter more particularly described and claimed.

Figure 1:
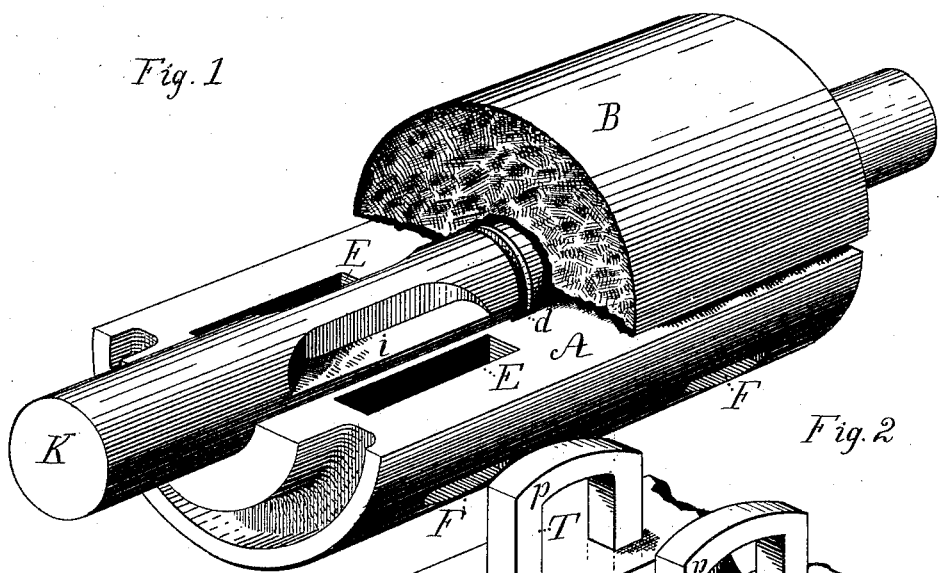
Figure 2:
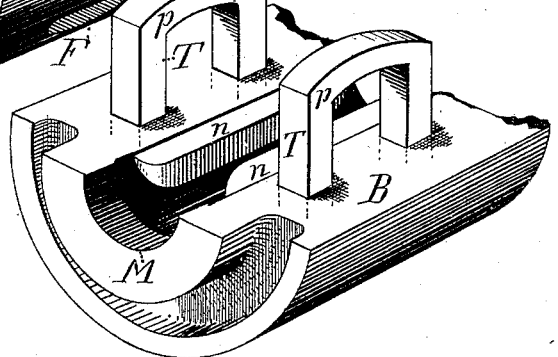
Figure 3:
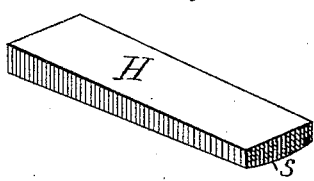
Figure 4:
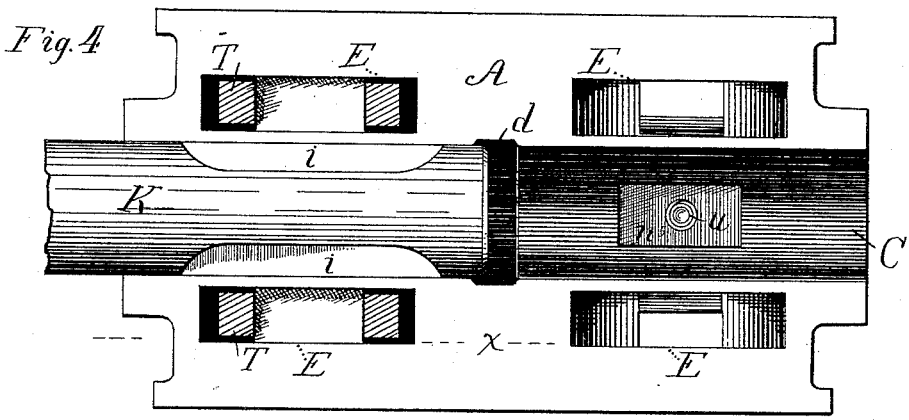
Figure 5:
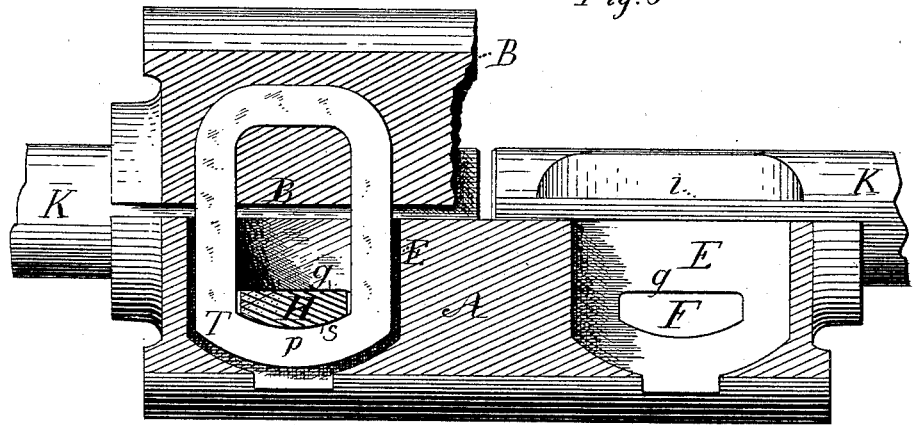
Figure 6:
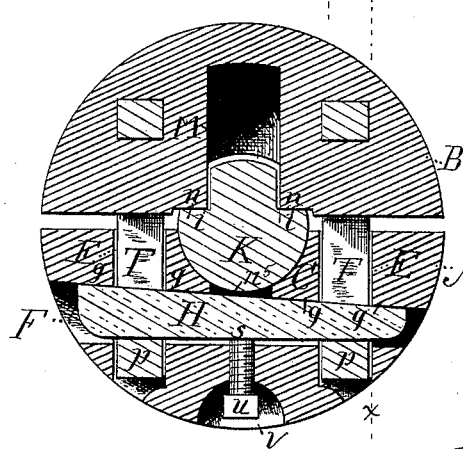
Figure 7:
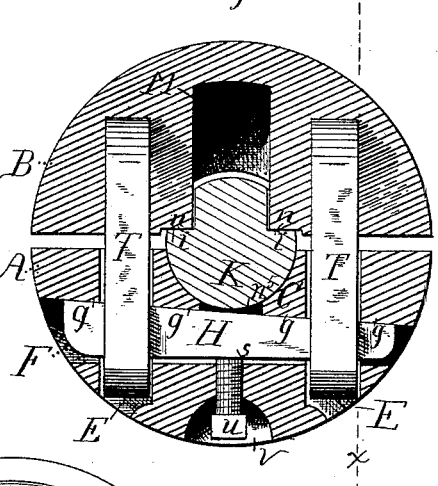
Figure 8:
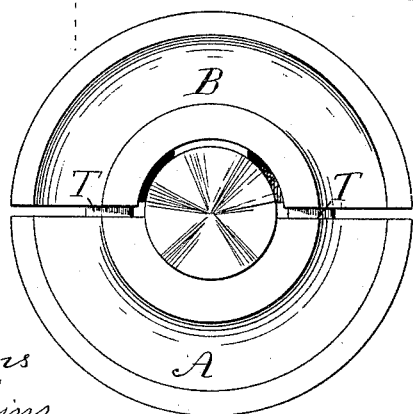
Figure 9:
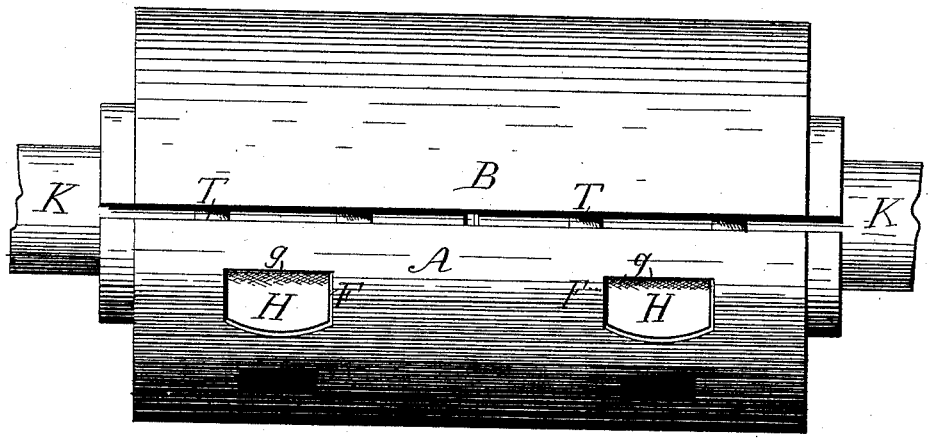
Figure 10:
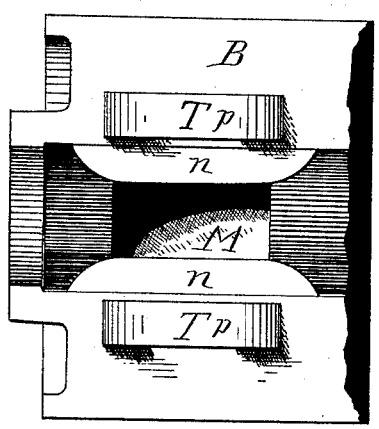
Figure 11:
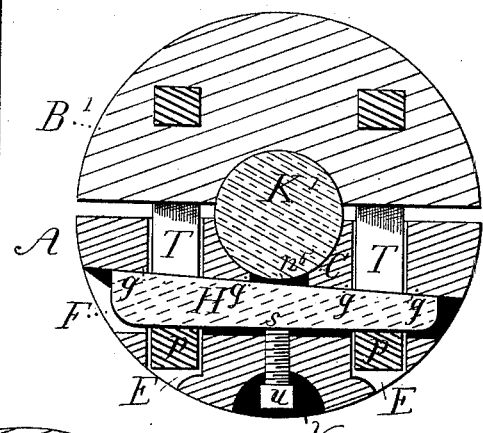
Figure 12:
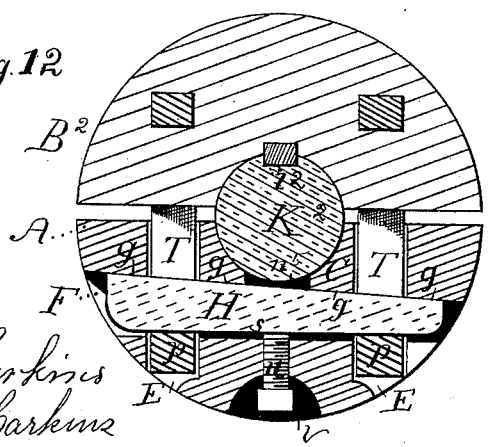

In the accompanying drawings, forming a part of this specification, Figure 1 is a perspective view of my improved coupling with a portion of one of the compression-sections removed to show the construction, and Fig. 2 is a view of such removed part. Fig. 3 is a view of the locking wedge or key. Fig. 4 is a plan view of the lower compression-section in Fig. 1, showing one of the shafts in place and a corresponding key. Fig. 5 is a lengthwise section on the line $x$, Figs. 4, 6, and 7. Fig. 6 is a cross-section on the line $y$, Fig. 5. Fig. 7 is a cross-section similar to Fig. 6, but showing the straps and key entire. Fig. 8 is an end view, and Fig. 9 is a side elevation, showing the coupling in the same position as in Fig. 5. Fig. 10 is a plan view of a portion of a section corresponding to Fig. 2. Figs. 11 and 12 are cross-sectional views on the line $y$, Fig. 5, but showing modified means for holding the shafts. Fig. 13 is a plan view of the lower side of the upper compression-section shown in the other figures, but having multiple driving-shoulders. Figs. 14 and 15 are views of shafts having multiple seats corresponding to the compression-section shown in Fig. 13. Fig. 16 is an end view of the upper section; and Figs. 17, 18, and 19 show modified forms of the clamping-straps.

Referring to the drawings, the letters A and B respectively designate the opposite compression-sections of my improved coupling, which sections are essentially different in construction and function and are here termed, respectively, the "liner" and "driver" sections, as indicative of their distinctive features. A is the liner-section, and B the driver-section, and both are made semi-cylindrical in shape to form a pulley when arranged and secured together with their flat sides in juxtaposition.

The liner A has a straight semi-cylindrical groove C throughout its length on the flat side concentric with its periphery to receive the shafts. The groove is preferably slightly enlarged midway of its length to form a chamber or clearance-space $d$ for the ends of the shafts to project into, so that their alignment will not be affected by "burrs" or bruises at their ends. In each half-length of the liner-section is a pair of longitudinal recesses E— one upon each side of the shaft-groove C— parallel with it and extending into the casting vertically to its flat side and nearly or quite through to the circumference thereof. Each pair is connected below the shaft-groove by a transverse passage or "keyway" F, which cuts through the circumference of the piece on both sides, as shown. The sides of the keyways adjacent to the shaft-groove are extended slightly obliquely or inclined to the recesses E instead of exactly at a right angle therewith, and form bearings $g$ for the tapering keys H, which hold or lock the parts together, as hereinafter described.

The shafts K are received in the groove C in the liner with their ends nearly meeting about midway of its length over the clearance-space $d$. Each shaft has a pair of longitudinal seats $i$ extending from near its end nearly to the end of the coupling respectively on opposite sides of the shaft and facing in opposite rotating directions. These seats are preferably arranged nearly down to the diametral plane through the shaft, so that when the shafts are in position in the liner the said seats will be raised somewhat above the flat surface of the casting and facing away from it, as shown in Figs. 1, 6, and 7. The seats are formed by milling into the side of the shaft with a cylindrical cutter to the requisite depth and then milling along the shaft longitudinally in a straight plane, forming a trough-like recess, the flat side of which is a seat $i$.

In Figs. 14 and 15 a shaft $K^3$ is shown with the seats $i^3$ formed by simply sinking the cutter into the side of the shaft to the depth required, thus forming a segmental-shaped seat, and when the seats are so formed it is preferable to provide two of them on each side of the shaft, as shown, as they are limited in length. In fact, several segmental seats may replace a single long seat, as preferred; but in any case it is best to make all the seats in the same lengthwise plane and well down toward the diametral plane of the shaft and parallel therewith.

The driver-section B is formed with a chamber or groove M on the flat side to receive the shafts, and is provided with a pair of projections or shoulders $n$, which correspond to the seats in the shaft and are adapted to fit upon them. The shoulders project into the chamber M in the driver, which chamber is made sufficiently large to prevent any contact of the casting with the circumference of the shaft, thus insuring the most perfect contact of the shoulders of the driver and the seats in the shaft. If multiple seats $i^3$ are made in the shaft, as shown in Figs. 14 and 15, then there will be multiple shoulders $n^3$ on the driver $B^3$ corresponding to the said seats, as shown in Fig. 13.

In each half-length of the driver B is a pair of loops, eyes, or U-shaped straps T, depending from its flat side and corresponding to and adapted to fit within the recesses E in the liner. These depending looped straps are wrought-iron bands or straps made by welding the ends of a bar together, and they are embedded in the driver at their upper ends by having the cast-iron cast or formed around them, the straps being secured in the mold in position and thus held while the molten metal flows around them. Thus the looped straps are practically integral with the casting and cannot by any possibility be pulled therefrom if inserted in the cast-iron to a sufficient depth. Instead of bands or endless straps, which are strongest, U-shaped straps may be used instead, having their ends simply headed, bent over or merely upset, as shown, respectively, in Figs. 17, 18, and 19, all of which forms are sufficiently strong if properly embedded. Each pair of straps is in the same rotating plane with their openings or passages through the loops transverse to the shaft and coincident—that is, having the same central plane. When the driver is in its place on the liner, the bridges or cross parts $p$ of the straps hang below the inclined sides of the keyways F—that is, the side nearest the shaft. The wedges or tapering keys may then be inserted in the said keyways and through the straps bearing between the cross parts $p$ thereof and the surfaces $g$ on the inner sides of the keyways, and as the keys are driven tightly into place the compression-sections will be forcibly wedged and drawn together with the shafts firmly clamped between them. Suitable set-screws $u$ are inserted in threaded perforations in the liner over the keyways and adapted to be screwed against the backs of the keys to secure them in place. There is, however, no tendency of the rotation of the shafts to work the keys loose, for the strain is imparted from one shaft to the other wholly through the driver B, so that no vibration of the shafts to and fro or variation in the speed thereof tends to "rock" the straps in the liner or move them lengthwise upon the keys to displace the keys. Thus the strain on the straps is wholly tensile, and the keys, if made with slight taper only, cannot work loose. Each key has a bearing on the casting on each side of each strap, so that the strain on the keys is direct and centrally over the key-bearings and is thus disposed to the best advantage possible. The set-screws insure the retention of the keys in place, and the heads of the screws are received in suitable cavities V on the outside or circumference of the liner, and thus do not project above the surface of the coupling to prevent the use of the pulley.

One of the seats $i$ in each shaft and the corresponding shoulders in the cap receive the strain of the power transmitted when the shafts are revolving in one direction, and the opposite seats and shoulders take the strain when the rotation is in the opposite direction. Thus when the motion of the shafting is reversed the strain is changed from one set of seats to the other; but as the keys draw the cap down equally firm on all the seats there can be no lost motion in the parts to permit a slight vibration of the shafts in the liner when their motion is reversed or their speed changed. This is a highly important feature, for if the shaft can turn in the coupling, as in the case of the old, ordinary, and well-known flange-couplings having their keys improperly fitted laterally, the shafts would wear smaller and the bore of the coupling larger, thus ruining the coupling and shafts and throwing the shafting out of alignment; but where it is desired to lengthen out a line of shafting which is fitted with said ordinary flange-couplings, the shafts having the usual spline to receive a longitudinal key, I bore out both the liner and the driver to receive the end of such line of shafting $K^2$, as shown in Fig. 12, and place a key-spline in that end of the driver to receive the key $i^2$, as in ordinary couplings; also, with very small shafting both the liner and driver may be bored to receive the shaft $K'$, thus depending upon the friction of the surfaces in contact to transmit the power, as shown in Fig. 11, for my improved mode of compressing the opposite sections of the coupling together insures a powerful clamping effect, whereby the shafts are rigidly gripped and held with great clutching force. The holes for inserting and removing the keys H and the cavities for the set-screws $u$, and also the openings where the recesses E cut through the outside of the casting, are not large enough to interfere with the smooth running of a belt on the circumference of the coupling, and an outside sleeve or shell is not required to make a pulley of this improved coupling.

As far as the driving power and efficiency of the coupling is concerned it is immaterial which compression-section the shoulders that engage the seats of the shaft are placed in, so long as the groove for receiving the shaft is in the opposite section; but it will be seen that if the shaft-groove is in the section in which there are no straps then two such pieces may be placed together and bored at one operation, whereas if the straps were in the liner-section only one piece could be bored at a time, thus doubling the cost. The only work on the inside portion of the driver is the planing of the faces $n$ smooth; or they may be used in some cases as they come from the casting process. The faces of the seats are preferably placed coincident or nearly coincident with the face of the driver to facilitate dressing them smooth, and the chambers M for receiving the shafts may be of any size and shape, as it is preferable to have the casting free from contact with the circumference of the shaft. These chambers are here shown as penetrating nearly to the outside of the driver to lighten the casting. There should also be a slight clearance between the parallel sides of the shoulders in the driver and the corresponding sides of the depressions in the shafts to thus insure the intimate contact of the shoulders $n$ and the seats $i$.

As the shoulders $n$ nearly fill the depressions in the shaft and the keys H nearly fill the keyways laterally, the shafts are thus held from endwise movement in the couplings and cannot pull apart.

This improved coupling may be applied to or removed from the shafts without being moved endwise thereon or disturbing the shafting, and it may be put up in a space only equal to its own length. The shafting can be put up and aligned and the couplings thus placed upon it without moving or disturbing hangers or pulleys, as it is only necessary to lay the driver-section over the ends of the shafts and then place the line in position and insert the tapering keys or wedges H, all of which actions involve movements in a radial direction only and may consequently be performed with the utmost ease and dispatch and in the most limited space. The keys may then be driven firmly into place and the set-screws tightened, when the shafts will be completely and rigidly coupled and incapable of detachment, except by the removal of the keys. To uncouple the shafts these keys may readily be driven out and the compression-sections removed.

I prefer to provide an opening $n^5$ from the shaft-groove into each of the key-passages, and thus reduce the bearing-surface in the groove, so that the shafts bear, principally, at the ends of the portions inserted in the coupling, which better insures their alignment in case the shafts should be slightly sprung or of varying diameter. The segmental shoulders of the driver and seats of the shafts are also set apart longitudinally to distribute the pressure along the parts instead of concentrating it in a manner that would be liable to spring the shafts. The said segmental seats shown in Figs. 14 and 15 may be made by a simple counterbore or cutter in a common drill-press, the shaft being held in a suitable jig or clamp having holes or seats to receive and guide the "teat" of the counterbore and provided with suitable stops or means for bringing all the seats to a uniform depth.

In cases where a coupling of extremely short lengths is required a single pair of straps only may be used, and one key, as would be shown if the coupling represented in Fig. 9 were cut in two parts on the central cross-section, the driver being half of an ordinary section, as Fig. 10, and each shaft having a single pair of segmental seats. Two pairs of straps are preferable always, if possible, as they distribute the strain to advantage and the shafts cannot accidentally uncouple, except by simultaneous loosening of both keys, thus insuring the utmost safety.

I claim—

1. In a compression-coupling, the combination of the shafts, a compression-section having a longitudinal shaft groove or recess, and a depending loop or strap on each side thereof in each half-length of the section, formed of a wrought-metal bar bent into U shape and having its ends provided with holding shoulders or abutments and embedded in the body of the section, each pair of opposite loops being arranged with their openings or spaces transverse to the shaft and coincident, an opposite compression-section having a shaft-groove, longitudinal slots or recesses to receive the corresponding loops or straps of the opposite section, and a transverse key way or passage in each half-length thereof extended across the section and joining the corresponding pair of recesses, and wedges or keys adapted to be inserted through the said key-passages and the straps of the opposite section to draw and clamp the sections together and upon the shafts.

2. In a shaft-coupling, the combination of the shafts having driving-seats facing in opposite rotating directions, a compression-section provided with shoulders or projections fitting and adapted to bear upon the seats of the shafts and having a pair of loops or straps depending from its inner face on each half-length of the casting, the loops of each pair being on opposite sides of the shaft, with their openings transverse thereto and coincident, an opposite compression-section having a shaft-groove and formed to receive the said loops or straps and having key bearings or surfaces coincident with the openings through said straps and nearer the parting plane of the coupling than the bridges or cross portions of the straps when the sections are together, and tapering keys or wedges corresponding to the pairs of straps and adapted to be inserted through them between the cross portions thereof and the key-bearings of the opposite sections to draw and wedge the sections together and clamp them firmly upon the shafts and couple the same, as specified.

3. In a shaft-coupling, the combination of the shafts having longitudinal seats milled in the opposite sides thereof and facing in opposite rotating directions, a compression-section provided with driving shoulders or projections corresponding to and adapted to fit upon the said seats and having in each half-length a pair of depending loops, eyes, or straps formed of wrought-metal bars bent into U shape and having their ends provided with holding shoulders or abutments and embedded in the body of the section, the straps of each pair being on opposite sides of the shaft, with their openings transverse thereto and coincident, an opposite compression-section having a groove to receive the shafts, the recesses corresponding to and adapted to receive the said depending loops of the opposite section and having a transverse passage across and connecting each pair of said recesses below the shaft-groove, and the tapering keys or wedges adapted to be received in the said passage and through the said loops to draw the sections together and clamp the shafts between them with the shoulders of the section and the seats of the shafts in intimate contact, as and for the purpose specified.

4. In a shaft-coupling, the combination of the shafts having the segmental seats $i^3$ facing in opposite rotating directions, a compression section or driver provided with a shaft-recess and shoulders $n^3$ corresponding to and fitting the said seats and having the depending wrought-iron loops or straps embedded in the casting at their upper ends, the pair of straps in each half-length of the section having their openings transverse to the shaft and coincident or in the same rotating plane, an opposite compression section or liner having a shaft-groove and longitudinal recesses E on each side thereof to receive the loops or straps of the driver and having a transverse key way or passage across and connecting each pair of longitudinal recesses transversely below the shaft-groove, and the wedges or keys H, adapted to be inserted in the said key-passages and through the said straps to draw and clamp the driver and liner sections together and force and hold the driving-shoulders of the driver upon the seats in the shafts and clamp the shafts in the groove in the liner, as and for the purpose specified.

5. In a shaft-coupling, the combination of the shafts having the seats $i^3$ in opposite sides thereof and facing in opposite rotating directions, a compression section or driver provided with a shaft-recess and shoulders $n^3$ corresponding to and fitting the said seats and having the depending wrought-iron loops or straps embedded in the driver at their upper ends, the pair of loops in each half-length of the section being in the same rotating plane and having their openings in alignment and transverse to the shaft, an opposite compression section or liner having a shaft-groove and longitudinal recesses E on both sides thereof to receive the said straps or eyes of the driver, each pair of recesses being connected by a transverse passage having key-bearings on the side nearest the shaft and on each side of the recesses, the said transverse passages opening at each end on the circumference of the casting, the tapering keys or wedges H, adapted to be inserted in the said transverse passages through the depending straps of the driver to draw and wedge the compression-sections together and clamp them upon the shafts with the shoulders of the driver clamped tightly upon the seats of the shafts, and set-screws fitted through threaded perforations in the liner-section over the backs of the said tapering keys and adapted to be screwed tightly against the keys to secure them in place, all arranged substantially in the manner and for the purpose specified.

GEORGE L. BARNES.

Witnesses:
JOSEPH H. GREENLEAF,
JACOB P. WRIGHT.